(12) United States Patent
Gabrielson

(10) Patent No.: US 8,417,550 B2
(45) Date of Patent: Apr. 9, 2013

(54) INLAND FREIGHT MANAGEMENT

(75) Inventor: Richard S. Gabrielson, Apple Valley, MN (US)

(73) Assignee: Target Brands, Inc., Minneapolis, MN (US)

( * ) Notice: Subject to any disclaimer, the term of this patent is extended or adjusted under 35 U.S.C. 154(b) by 492 days.

(21) Appl. No.: 11/833,120

(22) Filed: Aug. 2, 2007

(65) Prior Publication Data
US 2009/0037234 A1    Feb. 5, 2009

(51) Int. Cl.
*G06Q 99/00* (2006.01)

(52) U.S. Cl.
USPC ....... 705/7.11; 705/7.12; 705/7.22; 705/7.23; 705/7.25

(58) Field of Classification Search .................. 705/8, 1, 705/400, 7.11, 7.12, 7.23, 7.25
See application file for complete search history.

(56) References Cited

U.S. PATENT DOCUMENTS

| | | |
|---|---|---|
| 3,908,113 A | 9/1975 | Maxham et al. |
| 4,336,589 A | 6/1982 | Smith et al. |
| 4,340,810 A | 7/1982 | Glass |
| 4,527,937 A | 7/1985 | Tomasello, Jr. |
| 4,832,204 A | 5/1989 | Handy et al. |
| 5,038,283 A | 8/1991 | Caveney |
| 5,362,949 A | 11/1994 | Gulick |
| 5,363,310 A | 11/1994 | Haj-Ali-Ahmadi et al. |
| 5,450,317 A | 9/1995 | Lu et al. |
| 5,550,745 A | 8/1996 | Wurz |
| 5,564,879 A | 10/1996 | Noguchi |
| 5,568,393 A | 10/1996 | Ando et al. |
| 5,595,263 A | 1/1997 | Pignataro |
| 5,623,413 A | 4/1997 | Matheson et al. |
| 5,631,827 A | 5/1997 | Nicholls et al. |
| 5,870,715 A | 2/1999 | Belitz et al. |
| 5,893,081 A | 4/1999 | Poppen |
| 5,900,610 A | 5/1999 | Kelly, Jr. |
| 5,953,234 A | 9/1999 | Singer et al. |
| 6,094,642 A | 7/2000 | Stephenson et al. |
| 6,148,291 A | 11/2000 | Radican |
| 6,164,537 A | 12/2000 | Mariani et al. |
| 6,227,377 B1 | 5/2001 | Bonnet |

(Continued)

FOREIGN PATENT DOCUMENTS

WO    0229644    4/2002

OTHER PUBLICATIONS

International Search Report and Written Opinion of the International Searching Authority, International Application No. PCT/US08/71746, mailed Jan. 5, 2009 (12 pages).

(Continued)

*Primary Examiner* — Akiba Allen
(74) *Attorney, Agent, or Firm* — Nixon & Vanderhye P.C.

(57) ABSTRACT

An inland freight management module for managing inland moves of freight from a plurality of vendor supply locations to port includes a profile maintenance component, a load planning component, and a load routing and booking component. The profile maintenance component is adapted for maintaining an inland planning zone profile including information relating to a plurality of inland planning zones generated according to one or more customs districts. The load planning component is programmed for planning field consolidation of one or more container loads via a multi-stop route between the plurality of vendor supply locations, where the multi-stop route is generated within one of the plurality of inland planning zones.

6 Claims, 13 Drawing Sheets

U.S. PATENT DOCUMENTS

| | | | |
|---|---|---|---|
| 6,321,138 | B1 | 11/2001 | Livesay et al. |
| 6,332,098 | B2 | 12/2001 | Ross et al. |
| 6,411,897 | B1 | 6/2002 | Gaspard, II |
| 6,505,730 | B1 | 1/2003 | Linder |
| 6,536,659 | B1 | 3/2003 | Hauser et al. |
| 6,697,812 | B1 | 2/2004 | Martin |
| 6,704,613 | B2 | 3/2004 | Gomez |
| 6,754,634 | B1 | 6/2004 | Ho |
| 6,879,962 | B1 | 4/2005 | Smith et al. |
| 6,915,268 | B2 | 7/2005 | Riggs et al. |
| 6,937,992 | B1 | 8/2005 | Benda et al. |
| 6,954,734 | B1 | 10/2005 | Kuelbs et al. |
| 6,961,658 | B2 | 11/2005 | Ohler |
| 7,003,474 | B2 | 2/2006 | Lidow |
| 7,016,764 | B2 | 3/2006 | Penkar et al. |
| 7,039,481 | B2 | 5/2006 | Kawase et al. |
| 7,092,775 | B2 | 8/2006 | Nomoto et al. |
| 7,177,825 | B1 | 2/2007 | Borders et al. |
| 7,561,533 | B2 * | 7/2009 | Aklepi et al. ............ 370/255 |
| 2002/0019759 | A1 * | 2/2002 | Arunapuram et al. ......... 705/7 |
| 2002/0082880 | A1 | 6/2002 | Salloum |
| 2002/0091536 | A1 | 7/2002 | Seaman et al. |
| 2002/0099599 | A1 | 7/2002 | Minassian |
| 2002/0123918 | A1 | 9/2002 | Brown et al. |
| 2003/0004839 | A1 | 1/2003 | Lin et al. |
| 2003/0014286 | A1 * | 1/2003 | Cappellini ............... 705/5 |
| 2003/0023465 | A1 | 1/2003 | Smith et al. |
| 2003/0050819 | A1 | 3/2003 | Koenigbauer et al. |
| 2003/0093178 | A1 | 5/2003 | Russell et al. |
| 2003/0216993 | A1 | 11/2003 | Goldwerger et al. |
| 2003/0220711 | A1 | 11/2003 | Allen |
| 2003/0229550 | A1 | 12/2003 | DiPrima et al. |
| 2004/0000586 | A1 | 1/2004 | White |
| 2004/0015392 | A1 | 1/2004 | Hammel et al. |
| 2004/0054570 | A1 | 3/2004 | Streetman |
| 2004/0111286 | A1 | 6/2004 | Koenig et al. |
| 2004/0204969 | A1 | 10/2004 | Wu |
| 2004/0230601 | A1 | 11/2004 | Joao et al. |
| 2004/0254826 | A1 | 12/2004 | Yang et al. |
| 2005/0015167 | A1 | 1/2005 | Searcy et al. |
| 2005/0015288 | A1 | 1/2005 | Reeves et al. |
| 2005/0091001 | A1 | 4/2005 | Lai et al. |
| 2005/0119926 | A1 | 6/2005 | Turetsky et al. |
| 2005/0149373 | A1 | 7/2005 | Amling et al. |
| 2005/0149453 | A1 | 7/2005 | Amling et al. |
| 2005/0165629 | A1 | 7/2005 | Bruns |
| 2005/0246192 | A1 | 11/2005 | Jauffred et al. |
| 2005/0288986 | A1 | 12/2005 | Barts et al. |
| 2006/0015396 | A1 | 1/2006 | Blomeyer |
| 2006/0074791 | A1 | 4/2006 | Jelaco |
| 2006/0218058 | A1 | 9/2006 | Wojcik et al. |
| 2006/0287926 | A1 * | 12/2006 | Mitchell et al. ............ 705/26 |
| 2007/0106781 | A1 | 5/2007 | Hancock et al. |
| 2008/0306795 | A1 * | 12/2008 | Ho ............................. 705/8 |

OTHER PUBLICATIONS

Logility Voyager Solutions, "Global Sourcing Management," copyright 2006, accessed Mar. 14, 2007, 2 pp., http://www.logility.com/solutions/global-sourcing-management.

Hunt et al., "Final Technical Report-A Survey of Logistics Problems occurring in Container Transportation," Jun. 10, 1996, 29 pp.

Tradestone Software, "TradeStone Software Announces General Availability of the TradeStone Suite," Apr. 4, 2005, accessed Mar. 15, 2007, 4 pp. http://www.tradestonesoftware.com.

Balzola, "Balancing Container Inventories for Ocean Carriers," Jun. 1999, 60 pp.

"Transportation/Freight Management," APL Logistics, copyright 2007, accessed Aug. 7, 2007, 2 pp., http://www.apllogistics.com.

U.S. Appl. No. 10/857,178, filed May 28, 2004.

U.S. Appl. No. 11/833,121, filed Aug. 2, 2007.

* cited by examiner

92

Shipment Selection List

| Data Element | Description | Business Rules |
|---|---|---|
| Operating Division | Division 1<br>Division 2 | Selected from List |
| Term of Sale | FOB<br>FCA<br>EXW | Selected from List |
| Vendor | | Displayed in screen heading if chosen as criteria |
| Inland Planning Zone Code | | Selected from List |
| Port of Origin Code | | Selected from List narrowed to Country |
| Factory Location | | Displayed in screen heading if chosen as criteria |
| Container Freight Station | CFS Consolidator<br>FTZ Consolidator | Displayed in screen heading if chosen as criteria |
| Destination Gateway | Examples<br>PNW Pacific Northwest<br>PSW Pacific Southwest | |
| Purchase Order Number | | Displayed in screen heading if chosen as criteria |
| Hazardous | | Displayed in screen heading if chosen as criteria |
| Temperature Controlled | | Displayed in screen heading if chosen as criteria |
| Interior Point Inter-modal | | Displayed in screen heading if chosen as criteria |
| Cubic Volume | | |
| Weight | | |
| Cartons | | |
| Carton Orientation | Yes<br>No | |
| Non Retail | Yes<br>No | |
| Reserved for Top Off [RSV] | Yes<br>No [default] | |
| Consolidator Container Freight Station (CFS) Status | In Transit - IT<br>Complete Receipt - CR<br>Partial Receipt - PR | |

Fig. 5

Load Summary

| Data Element | Description | Business Rules |
|---|---|---|
| Load Id | | System generated |
| Load Status | Draft<br>Pending [routing / tendering]<br>Routed<br>Tendered<br>Picked up | System determined based on events |
| Number of Shipments | Based on selection | |
| Total Cube (Volume) | Total of shipments | |
| Total Weight | Total of shipments | |
| Total Cartons | Total of shipments | |
| Equipment Category | | Selected from List |
| Equipment Size | | Selected from List |
| Equipment Type | | Selected from List |

Field Consolidation Savings

| Data Element | Business Rules |
|---|---|
| Current Date | System generated |
| Zone | |
| Load Status | |
| Port of Origin Code | |
| Planning Zone Description | |
| Consolidator Container Freight Station (CFS) Potential | All cubic volume for the day in the queue marked as Consolidator Container Freight Station (CFS) shipments |
| Consolidator Container Freight Station (CFS) Actual | All cubic volume for the day remaining the queue marked as Consolidator Container Freight Station (CFS) shipments |
| % Field Consolidation | Consolidator Container Freight Station (CFS) actual divided by Consolidator Container Freight Station (CFS) potential |
| % CAN Utilization | For each type of equipment used summarize the minimum cube [within weight max] for the number of sizes and types. Then compare that to the cube in the actual container loads built. |

Fig. 7

Routing & Booking

98

| Data Element | Business Rules |
|---|---|
| Operating Company | Displayed in screen heading and will display all those on the load. |
| Term of Sale | Will display the word 'mix' if both FCA and FOB are on an outbound Consolidator Container Freight Station (CFS) load. |
| Port of Origin Code | |
| Country | Displayed in screen heading if chosen as criteria |
| Factory City | |
| Factory Location | Displayed in screen heading if chosen as criteria |
| Container Freight Station | Depending on the load an Consolidator Container Freight Station (CFS) can be an origin or a desination. |
| Cargo Ready Date | |
| Appointment Date Range | Displayed in screen heading if chosen as criteria |
| Equipment Reservation Number | A number that represents a piece of equipment until the container number is associated. |
| Load Id | |
| Hazardous | Displayed in screen heading if chosen as criteria |
| Temperature Controlled | Displayed in screen heading if chosen as criteria |
| Interior Point Inter-modal | Displayed in screen heading if chosen as criteria |
| Inland Expedite | Displayed in screen heading if chosen as criteria |
| Total Cartons | |
| Main Carriage Mode | Displayed in screen heading if chosen as criteria |
| Equipment Category | |
| Equipment Size | |
| Equipment Type | |
| Inland Carrier/Consolidator | Displayed in screen heading if chosen as criteria |
| Ocean Carrier SCAC | |

Fig. 8

| FROM GATEWAY | | | TO GATEWAY | |
|---|---|---|---|---|
| Acronym | Description | Association | Acronym | Description |
| ASE | Atlantic | N/A | ASE | Atlantic Southeast |
| ASE | Atlantic | Secondary | ANE | Atlantic Northeast |
| ASE | Atlantic | Primary | ACC | Atlantic Central Coast [ORF] |
| ASE | Atlantic | Tertiary | SOE | South Central |
| ASE | Atlantic | Exception 5 | LAZ | Lazaro Cardenas |
| ASE | Atlantic | Exception 1 | PNW | Pacific Northwest |
| ASE | Atlantic | Exception 2 | PSW | Pacific Southwest |
| ASE | Atlantic | Exception 3 | PCC | Pacific Central Coast [OAK] |
| ASE | Atlantic | Exception 4 | PRC | Prince Rupert [Canada] |

Fig. 13

INLAND FREIGHT MANAGEMENT

BACKGROUND

The ability to actively and efficiently engage in global trade and the procurement of goods from vendors is essential to many businesses. Goods procured from vendors undergo various stages of transportation before arriving at their ultimate location. The goods will typically undergo inland transportation from the vendors to ports of origin. Then, the goods are consolidated and loaded into shipping containers, such as ocean equipment containers, for shipping from the ports of origin, or export gateways, to import gateways. Finally, the goods are delivered from the gateways to their ultimate destination. A need exists for improvements addressing the complexities of planning and executing the procurement and transportation of goods from vendors.

SUMMARY

Some embodiments relate to an inland freight management module for managing inland moves of freight from a plurality of vendor supply locations to port. The inland freight management module includes a profile maintenance component, a load planning component, and a load routing and booking component. The profile maintenance component is adapted for maintaining an inland planning zone profile including information relating to a plurality of inland planning zones generated according to one or more customs districts. The load planning component is in communication with the profile maintenance component and is adapted for building partial load freight shipments from the plurality of vendor supply locations into container loads. The load planning component is programmed for planning field consolidation of one or more container loads via a multi-stop route between the plurality of vendor supply locations, where the multi-stop route is generated within one of the plurality of inland planning zones. The load routing & booking component includes one or more interactive menus for booking inland freight carriers for the multi-stop route.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 5 shows features of a planning menu for viewing shipment planning information and making load planning and building selections, according to some embodiments.

FIG. 6 is schematic view illustrating features of a load summary of the Inland Freight Management Module, according to some embodiments.

FIG. 7 shows features of a field consolidation savings summary of the Inland Freight Management Module, according to some embodiments.

FIG. 8 shows features of an interactive Routing & Booking Component menus of the Inland Freight Management Module, according to some embodiments.

FIG. 13 shows examples of some Gateway Associations of the Gateway Balancing Component, according to some embodiments.

Figure 1:
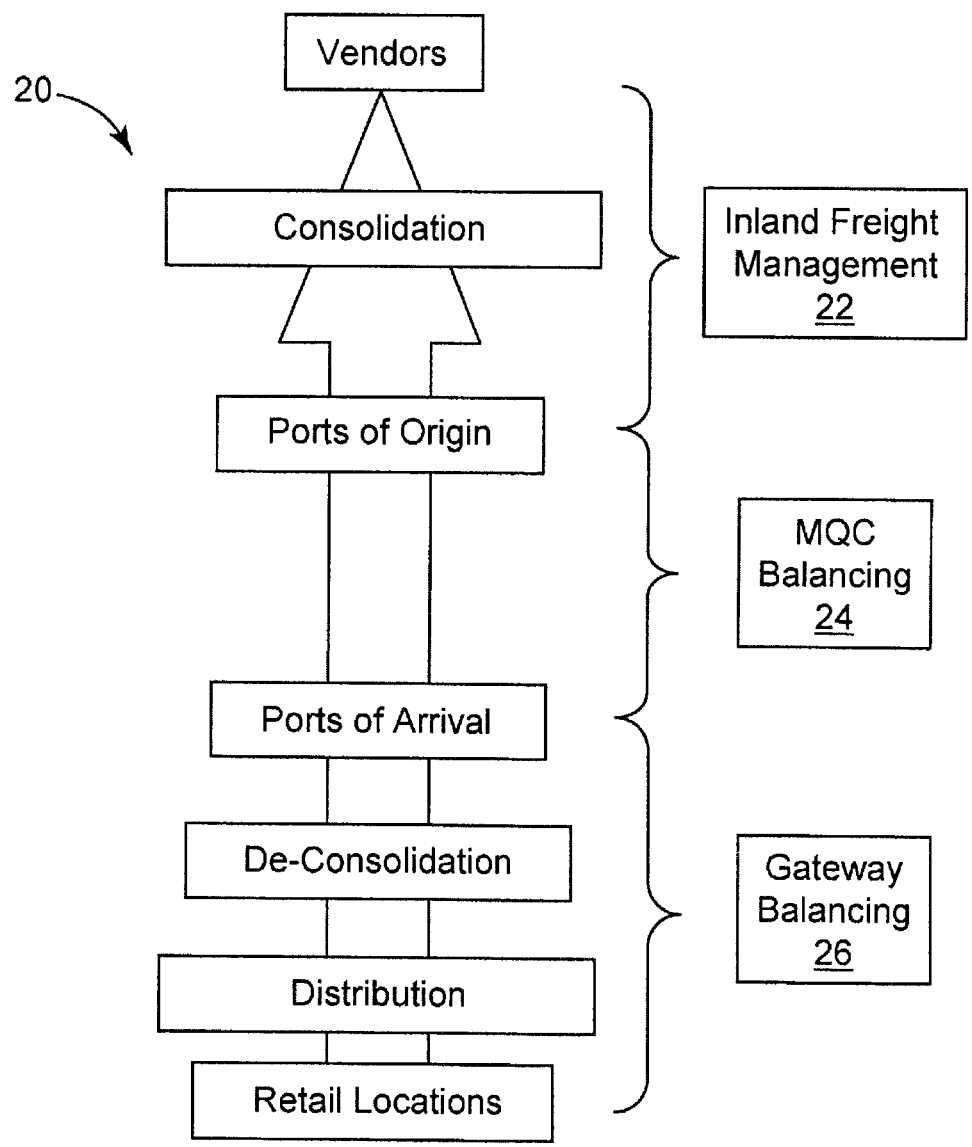
FIG. 1 is a schematic view of an Integrated Transportation Management System, according to some embodiments.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a schematic view of an Integrated Transportation Management System 20. The System 20 includes an Inland Freight Management Module 22, an MQC Balancing Module 24, and a Gateway Balancing Module 26. In some embodiments, the System 20 is entirely managed by a large retail entity (LRE), which directly or indirectly owns and/or operates a plurality of geographically-differentiated retail locations. In other embodiments, the System 20 is managed by a plurality of entities. Commonly owned U.S. patent application Ser. No. 11/833,121, filed on even date herewith, and titled "GATEWAY BALANCING," relates to similar matter and is incorporated herein by reference in its entirety for all purposes.

In general terms, the System 20 is utilized to manage the transportation of freight, also described as goods or products, from vendors to one or more ports of origin, the shipment of goods from ports of origin to ports of arrival, and the deconsolidation and delivery of the goods from ports of arrival to retail or other ultimate shipment locations. As used herein, a "port" is generally indicative of an ocean carrier port, an air terminal, or the like. Various portions of the System 20 are software-based, including databases, networks, and other, related technologies, although manual processes are also contemplated. In some embodiments, instructions and other information relating to the various system processes described herein are stored on a computer readable media and/or written documentation as desired.

As will be understood with reference to the following description, various features of the System 20 are implemented as interactive menus presented to one or more system users. These types of interactive menus are optionally made available to system user(s) utilizing a user interface including computer hardware, software, computer readable media, and related components for displaying and receiving system information such as a computer work station. As used herein, a "user interface" includes, but is not limited to, a single location, or single work station, for example. In some embodiments, the user interface is optionally viewed and/or manipulated from multiple locations as desired. For example, the user interface optionally includes a plurality of networked devices in geographically separated regions operated by one or more system users.

As shown in FIG. 1, the System 20 is optionally oriented relative to "in-store dates," the dates at which goods are to be delivered to the retail locations. Thus, the arrow indicating a transportation management process flow between the Modules 22, 24, 26 (or Apparatuses 22, 24, 26 according to some embodiments), is oriented relative to delivery date at the retail locations. In other words, the delivery dates to the retail locations are the goals, with the System 20 being oriented to deliver on those goals.

Figure 2:
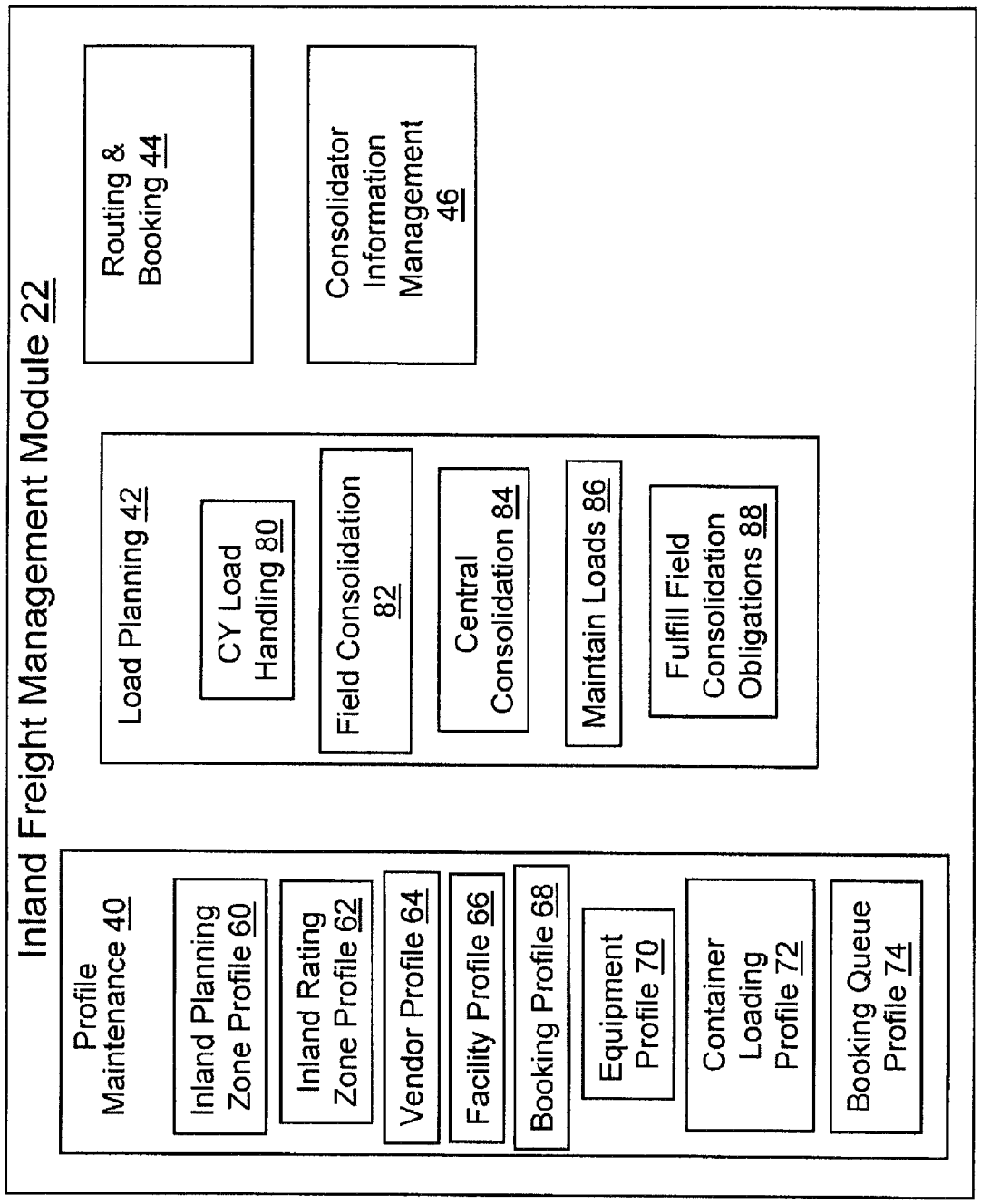
FIG. 2 is a schematic view of an Inland Freight Management Module of the system of FIG. 1, according to some embodiments.

FIG. 2 shows various components of the Inland Freight Management Module 22 in schematic form. The Inland Freight Management Module 22 includes a Profile Maintenance Component 40, a Load Planning Component 42, a Load Routing & Booking Component 44, and a Consolidator Information Management Component 46. In general terms, the large retail entity (LRE) manages the inland moves of shipments of freight from vendors, also described as vendor supply locations, suppliers, or supply locations, to ports of origin utilizing the Inland Freight Management Module 22, as will be described in greater detail.

The Profile Maintenance Component 40 includes means for maintaining an Inland Planning Zone Profile 60, an Inland Rating Zone Profile 62, a Vendor Profile 64, a Facility Profile 66, a Booking Profile 68, an Equipment Profile 70, a Container Loading Profile 72, and a Booking Queue Profile 74. In some embodiments, the Profile Generation and Maintenance Component 40 includes one or more databases for receiving and storing profile information. Profile information is optionally generated using manually input data and/or electronic data received from one or more remote sources, for example via a network connection.

In general terms, the Modules 22, 24, 26 each optionally draw on information from various profiles in forecasting and planning for inland shipping, international carriers, and/or ocean gateway intake and distribution. For reference, as used herein, an "international carrier" generally refers to an ocean carrier, an air carrier, or the like and is alternatively described as a container shipment carrier. As will be described in greater detail, the Inland Planning Zone Profile 60, as well as other system components, is adapted to promote reduction of inland freight consolidation at a consolidation facility and achieving network efficiencies. In particular, the effective use of multi-stop inland carrier routes increases field consolidation of container loads which, in turn, reduces the need to utilize consolidators.

For reference, a consolidator is a freight consolidation operation that is typically located proximate one or more ports of origin. A container freight station (CFS) facility is an example of a consolidator, also described as a central consolidator or freight forwarder. In turn, container yard (CY) facilities are located at ports of origin and operate for loading containers on carriers for overseas shipment. As used herein, a "CFS load" generally refers to a partial container load freight shipment or a load that is otherwise a candidate for consolidation, also described as a partial load shipment or partial container product shipment, for example. A "CY load" is a container load or one that is fully loaded at a vendor supply location and designated for direct routing to port, also described as a full container load, for example.

Figure 3:
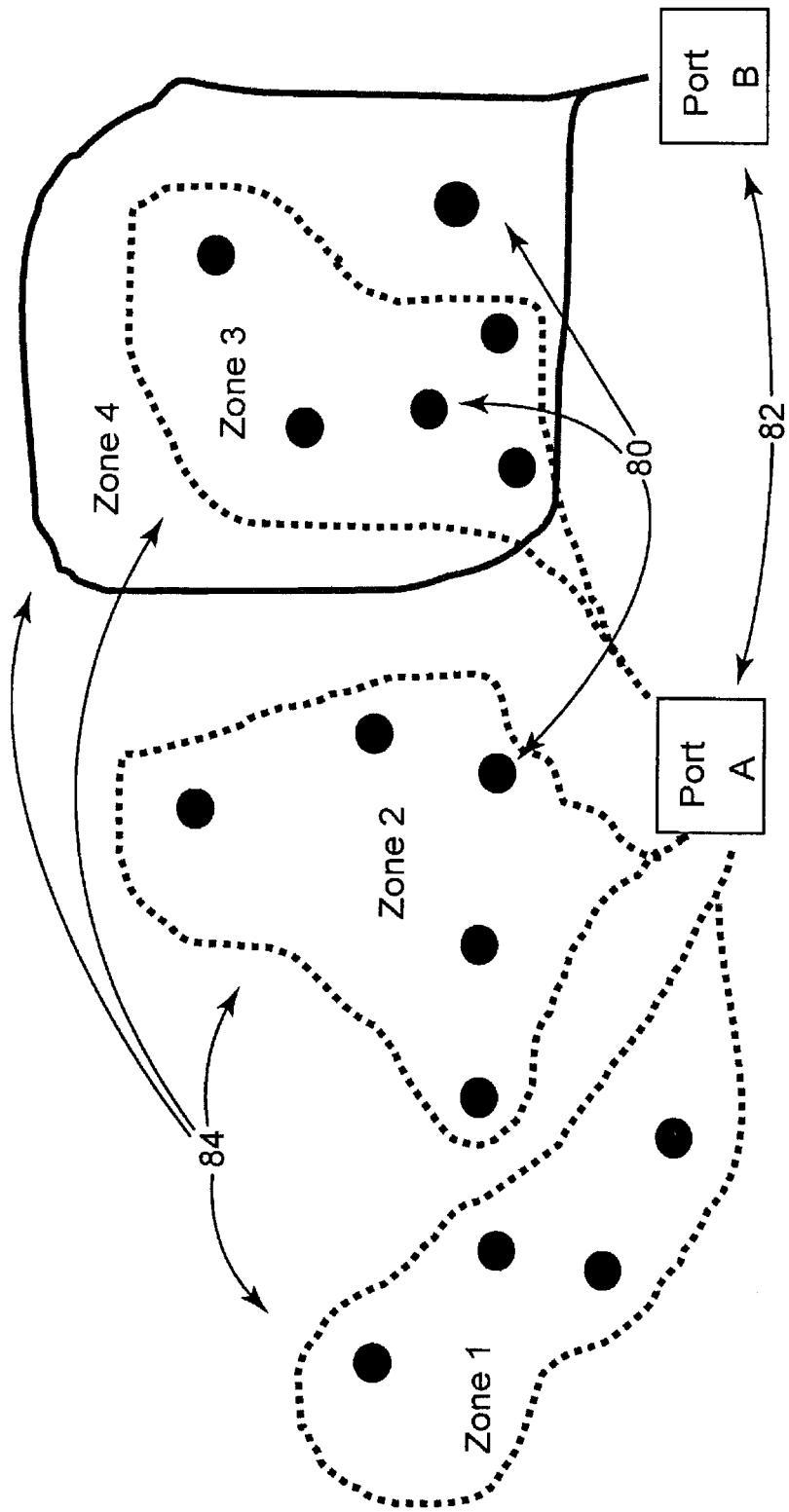
FIG. 3 is a schematic view of a plurality of inland planning zones of the Inland Freight Management Module, according to some embodiments.

The Inland Planning Zone Profile 60 includes planning zone information. FIG. 3 is a schematic illustration showing a plurality of vendor supply locations 80 (e.g., factories) associated to a plurality of ports of origin, or ports 82, according to one or more planning zones 84. The planning zones 84 are generated using geographic boundaries, governmental boundaries (e.g., state boundaries, province boundaries, city boundaries, or the like), and latitudinal and longitudinal coordinates relative to the vendor supply locations 80. The planning zones are also generated in view of customs district boundaries or are otherwise customs-district-based zones.

In some embodiments, one or more of the planning zones 84 are bounded by customs districts that would prohibit, interfere, or otherwise reduce the desirability of a multi-stop route crossing districts, for example via increased costs, permits, or other requirements for crossing customs districts. For reference, various types of customs districts are found throughout the world, including those associated with the Shenzhen and the Hong Kong Special Administrative Regions of China, for example. It should also be understood that the effect of customs districts can depend on the type of product being shipped, the type of equipment being used to ship the product, and other factors. As such, in some embodiments, customs districts are not a factor in multi-stop routing.

The Inland Rating Zone Profile 62 includes rating zone information. In some embodiments, rating zones are formed according to one or more of flat rate shipping costs for freight from the vendor locations based on port proximity (the cost of shipping from vendor supply locations within the rating zone to a particular port), shipping rates to port by weight, shipping rates to port by distance, or other shipping rate determination. The Inland Freight Management Module 22 optionally takes into account one or both of inland planning zones and inland rating zones.

The Vendor Profile 64 includes information relating to one or more vendor supply locations, such as supply location address, hours of operation, number of pieces of shipping equipment that vendor supply locations can handle at a given time, whether the location provides drop off container loading or live container loading, equipment restrictions, and other types of vendor information.

The Facility Profile 66 includes information relating to various consolidating and shipping facilities, such as Container Freight Stations (CFS), Foreign Trade Zone (FTZ) consolidators, Port of Export Terminals, Ocean Carrier Terminals, and Pre-Clearance Facilities, for example. The facility information includes facility address, hours of operation, number of pieces of shipping equipment that can be handled at a given time, equipment restrictions, or other types of facility information.

In some embodiments, the Booking Profile 68 includes a hierarchy of available inland freight carriers, such as inland trucking companies. In some embodiments, the Booking Profile 68 also has information relating to contracted minimum volume obligations for inland freight carriers, for example.

Figure 4:
FIG. 4 is a schematic view showing some types of equipment information associated with the Inland Freight Management Module, according to some embodiments.

The Equipment Profile 70 includes equipment information relating to the various components of the System 20. The Equipment Profile 70 includes availability information according to equipment categories, sizes, types, weight thresholds, maximum and minimum volume ranges, as well as other shipping equipment information. FIG. 4 is a schematic view of a data screen 90 showing some types of equipment information included with the Equipment Profile 70, although other equipment information is contemplated.

In some embodiments, the equipment information also includes various business rules. As one example, the equipment information may include a business rule that inland point intermodal (IPI) orders should only use 40 foot shipping containers. As alluded to above, information from the Equipment Profile 70 is optionally accessed by the other Modules 24, 26. For example, the business rule that inland point intermodal (IPI) orders should only use 40 foot shipping containers is optionally used in the Gateway Balancing Module 26 to avoid potential chassis limitations for drayage from a deconsolidator.

The Container Loading Profile 72 includes container loading information relating to shipping carton orientation, item loading order, and other container loading requirements. For example, in some embodiments the container loading information includes various container loading rules. One optional rule is that cartons of an inland shipment are to be loaded with purchase order and item markings facing the tail of the inland shipping container. In some embodiments, the Container Loading Profile 72 is accessed during inland freight carrier booking where the inland freight carriers are provided with one or more of the loading rules via e-mail, print out, or other means of communication. For example, the inland freight carriers are optionally notified of such business rules in order to help ensure compliance.

Another optional rule is that retail items are placed in the nose of the inland shipping container while non-retail items are placed in the tail of the inland shipping container. In some embodiments, this rule or related information is displayed to the system user during route planning & building. Using such information, the system user has the option of building the stop sequence of a multi-stop route between vendor supply locations to take into consideration whether a pick-up is for retail or non-retail purchase order items in order to help ensure that non-retail items are loaded last. In other embodiments, such business rules are automatically implemented by one or more system components via an appropriate algorithm.

The Booking Queue Profile 74 includes booking information relating to inland freight shipments that the Large Retail Entity (LRE) is responsible for building into container loads. This list of shipments is also described as the booking queue. The booking information, such as quantities, types of goods, whether loads are Container Yard (CY) loads vs. Container Freight Station (CFS) loads, as well as whether the large retail entity is responsible for shipping to port (FCA) or the vendor is responsible for shipping to port (FOB), and other booking information is a result of one or more vendor booking processes used by the Large Retail Entity (LRE). Although FCA and FOB are used as examples herein, it should be understood that use of other types of shipping information and designators, including all of those associated with internationally recognized Incoterms, are contemplated.

The Load Planning Component 42 includes a CY Load Handling Subcomponent 80, a Field Consolidation Subcomponent 82, a Central Consolidation Subcomponent 84, a Maintain Loads Subcomponent 86, and a Fulfill Field Consolidation Obligations Subcomponent 88. In general terms, the Load Planning Component 42 includes means for building inland freight shipments from vendors into container loads. The Load Planning Component 42 utilizes information from the Profile Maintenance Component 40 to help field consolidate inland freight shipments into container loads using multi-stop routes (as opposed to consolidating inland freight shipments at container freight stations, for example). Generally speaking, and where appropriate, the container loads are planned to reduce trips to port, to generate fuller container loads, and/or to address the need for alternative use containers to meet special shipment needs (e.g., reefers). Some embodiments also promote utilization of larger containers where appropriate. For example, one container planning hierarchy includes, 45 foot container loads first, then 40 foot high cube container loads, then 40 foot standard container loads, and so forth, although other hierarchies are also contemplated.

In some embodiments, the subcomponents are implemented using a series of interactive menus similar to those previously described that display information to the system user and allow selection of available shipping options. The container loads and associated inland freight routes are optionally automatically or semi-automatically built by the Load Planning Component 42 as desired.

In some embodiments, the Load Planning Component 42 includes means for accessing the Booking Queue Profile 74, for example a network connection, and then narrowing, or filtering the booking information according to various freight shipment selection criteria, including criteria generated from the Profile Maintenance Component 40. FIG. 5 shows some features of a planning menu 92 adapted to allow the system user to view shipment planning information and make various load planning and building selections. As described in greater detail, the planning menu 92 includes one or more interactive sets of menus that draw information from, or otherwise interact with various system components, although other types of interfaces are also contemplated. During load planning and building, the system user optionally selects various shipment selection criteria on the planning menu 92 to narrow the inland freight shipments available to the system user for planning and building loads.

The CY Load Handling Subcomponent 80 includes means for identifying container yard shipments, also described as CY loads or full container loads, that have been booked from vendor supply locations. In some embodiments, the CY Load Handling Subcomponent 80 includes one or more algorithms for automatically designating free carrier (FCA) CY loads, as pending routing/tendering. The designated FCA CY loads are then automatically removed from the booking queue and associated with an international carrier (e.g., ocean or air carrier) by the CY Load Handling, bypassing additional multi-stop routing load planning.

In other embodiments, the CY Load Handling Subcomponent 80 is implemented utilizing user selection criteria on one or more interactive menus, such as those of the planning menu 92. For example, the system user optionally filters the booking queue down to FCA CY loads and then builds the FCA CY loads into CY shipments which are directly routed to port.

Although planned FCA CY loads are typically sent directly to port, various problems arise which result in "light loads." For example, there can be last minute production problems at the vendor supply location such that some of the freight is not ready for pick up. In some embodiments, the system user is provided with this type of information via an alert on one or more of the interactive menus. The system user is then presented with the option of letting the light load go directly to port as planned or building the light load into a multi-stop route for greater equipment utilization.

The Field Consolidation Subcomponent 82 includes means for identifying and selecting shipments for field consolidation. In some embodiments, the Field Consolidation Subcomponent 82 includes interactive menus for filtering the booking queue information to display inland freight shipments in need of consolidation, also described as partial container load freight shipments or CFS shipments, for example. As previously alluded to, in some embodiments the vendor booking processes previously defines the partial load shipments that would take two or more shipments to equal a container, or CY load.

In some embodiments, the system user is able to select shipments to build into loads according to the Planning Zone Profile 60. For example, the booking queue shipments are optionally filtered to partial load shipments, which are then filtered by planning zone. In general terms, multi-stop routes are planned within a planning zone by starting with a first vendor supply location and building a multi-stop route including other vendor supply locations within the planning zone. In other embodiments, multi-stop routes are built across planning zones where appropriate. The multi-stop route is planned taking into account such information as the shipment volume scheduled for pick up at each vendor location and the timing/availability of shipment items from the vendor supply locations, for example, as well as other information.

As previously referenced, the system user is optionally provided with available planning information on one or more interactive menus such as those previously described. The user then selects shipments from various vendor supply locations to build a multi-stop route for field consolidation. In other embodiments, the Field Consolidation Subcomponent 86 includes algorithms or other means for automatically evaluating the planning information and multi-stop routing the partial load freight shipments. The results of the automatic evaluation are optionally provided to the system user as one or more suggested loads along corresponding multi-stop routes.

After loads have been built within one or more planning zones, the remaining CFS shipments that need to be built into loads can be built across planning zones for field consolidation as desired. In some embodiments, the system user designates which of the remaining shipments are appropriate for cross-planning-zone field consolidation. As described in greater detail, the shipments that are not selected for field consolidation are consolidated via other mechanisms, such as via consolidation at a container freight station (CFS). In some embodiments, the Field Consolidation Subcomponent 82 includes algorithms or other means for automatically evaluating the planning information and providing one or more suggested cross-planning-zone field consolidation load routes.

Several loading scenarios lend themselves to field consolidation, or multi-stop routing according to various embodiments. For example, in some embodiments, a multi-stop route results in a full container load which is then directed to port. The system user optionally utilizes information from the profiles, such as shipment weight, cubic volume, cargo ready dates, vendor supply location city and/or other information to build the load and the sequence of stops along the multi-stop route using one or more interactive menus.

As another example, a multi-stop route optionally results in a partial load (a "head load shipment") which is then delivered to a consolidator, such as a Foreign Trade Zone (FTZ) consolidator, to be further combined into a full load, or fuller load, with a "top off" shipment. In order to promote efficient consolidation, preparation is made in advance for the "top off" shipment to be delivered to the consolidator in concert with the "head load" shipment coming off of the multi-stop route.

If the head load shipment and the top off shipment have different destination gateways, the system user is provided with the option of changing one of the gateway destinations or rejecting the pairing of those container load partial freight shipments according to some embodiments. In another embodiment, the Field Consolidation Subcomponent 88 is otherwise adapted to automatically determine whether "top off" and "head load" shipments are suited for combination. If the head load shipment is the result of overflow from a Container Yard (CY) shipment, the system user is provided with an option of putting the overflow shipment with a different carrier and/or on a different vessel/voyage.

The Central Consolidation Subcomponent 84 includes means for consolidating the FCA partial loads that were not selected for field consolidation and means for consolidating freight on board (FOB) partial loads. In some embodiments, the system user has the option of building loads prior to consolidator receipt or after consolidator receipt. In some embodiments, the Central Consolidation Subcomponent 84 is adapted for identifying and selecting a plurality of partial load freight shipments and routing the plurality of partial load freight shipments to a central consolidator.

With FCA shipments, the Large Retail Entity (LRE) is typically responsible for managing routing of the partial load shipment to the consolidator. For example, the system user optionally books a piece of equipment, such as a truck or lorry, for bringing the partial load shipment to the consolidator using one or more interactive menus or other appropriate means.

With FOB shipments, the vendor is responsible for managing delivery of the partial container load shipment to the consolidator, although the system user is provided with information relating to the inbound FOB partial shipment, including notification as to shipment timing. Such information is provided, for example, on one or more interactive menus of the Central Consolidation Subcomponent 84 to facilitate management of load consolidation. In particular, the system user is able to better select shipments from the inbound list and create outbound loads to the port if the inbound FOB shipment information is also known. The carrier and vessel/voyage are then assigned once the load is created.

In some embodiments, the Maintain Loads Subcomponent 86 provides the system user with a load summary 94 in the form of one or more interactive menus, for example, after a plurality of shipment loads have been built. FIG. 6 is schematic view illustrating features of the load summary 94. For example, the load summary 94 includes information such as a system designated container number, load ID, load status, the number of shipments comprising the load, the total cubic volume of the load, and others. In some embodiments, the size and type of equipment for the loads are selected on the load summary 94. In other embodiments, the size and type of equipment is selected at earlier stages in the load planning and building process. Access to a list of equipment sizes and types is optionally provided to the system user by accessing the Equipment Profile 70.

The Maintain Loads Subcomponent 86 also includes means for the system user to add or remove shipments from a load using one or more interactive menus. In one embodiment, the Maintain Loads Subcomponent 86 prohibits adding or removing freight shipments from loads where the shipments have been booked with an inland freight carrier. For example, the system user is optionally alerted that the one or more shipments have been booked and is provided the option of sending a booking cancellation notice to the appropriate inland freight carrier. Additionally, when adding additional shipments to the load, the Maintain Loads Subcomponent 86 accesses and updates the booking queue. In particular, if one or more shipments are removed from the load, the shipments are put back in the booking queue to be used to build other loads.

The Fulfill Field Consolidation Obligations Subcomponent 88 includes means for the system user to view field consolidation efficiency information to help ensure a sufficient amount of field consolidation is achieved in load planning and building. In some embodiments, the field consolidation efficiency information is displayed on a Field Consolidation Savings Summary 96. One embodiment Field Consolidation Savings Summary 96 is shown generally in FIG. 7, although other values and data are optionally included than that shown. The efficiency information optionally includes a comparison of the cubic volume of CFS candidate loads to the actual field consolidation loads created. For example, at the beginning of the day, the Fulfill Field Consolidation Obligations Subcomponent 88 includes algorithms for computing the cubic volume of all freight that would go to a consolidator if no action were taken.

As loads are built and/or after load planning is completed, a comparison of the volume of field consolidated shipments to total partial container load freight shipments is evaluated. In some embodiments, this information is displayed to the system user on one or more interactive menus during load planning so that the system user has an idea of how efficiently the loads are being built in terms of maximum field consolidation. In some embodiments, a predetermined minimum efficiency, or field consolidation utilization, is required by the Fulfill Field Consolidation Obligations Subcomponent 88. If the predetermined minimum or goal is not met the system user, a supervisor, or others are provided with an appropriate alert. In at least this manner, Subcomponent 88 optionally includes one or more threshold efficiency requirements.

The efficiency information includes a comparison of the total number of partial load freight shipments that would go to a consolidator but for field consolidation, the field consolidated loads actually built, and a percentage field consolidation computed from the two. In some embodiments, the calculation is based on the total cubic volume of potential partial container load freight shipments and the actual partial container load freight shipments. This efficiency information is also optionally evaluated by planning zone. In some embodiments, cost savings are additionally or alternatively computed using a consolidation price per cubic volume associated with one or more consolidators.

The Routing & Booking Component 44 includes means for booking inland freight carriers (e.g., one or more trucks) for pick up and delivery of shipments forming container loads. The Component 44 also includes means for generating and delivering routing instructions to the booked inland freight carriers. As shown in FIG. 8, in some embodiments, the means include one or more interactive Routing & Booking Menus 98 that provide the system user with information as to the available inland freight carriers, the available equipment of the inland freight carriers, and other information from the various profiles, for example.

The system user is able to select inland freight carriers for the loads built using the Load Planning Component 42 which includes one or more interactive menus, for example. In some embodiments, the Equipment Profile 70 is updated as available equipment is selected for transporting the inland freight.

FIG. 8 illustrates some features of interactive menus 98 of the Routing & Booking Component 44 used by the system user. In some embodiments, selection criteria are used to designate various loads for booking and routing with an inland freight carrier. For example, the system user selects filtering criteria to reduce the list of loads having shipments needing inland carrier booking. The system user then selects one or more options, for example equipment type and inland carrier, and sends a booking request and routing instructions, such as an electronic booking request via e-mail or other electronic means.

In some embodiments, the booking request and routing instructions are provided with a dispatch report to the inland freight carrier. The routing instructions optionally include the scheduled appointment times for each pickup along a multi-stop route, the sequence of pickups at vendor locations along the multi-stop route, all necessary addresses in appropriate languages (English as well as the local language, for example), purchase order information, quantities that are to be to picked up at each vendor location, and other information as desired. The inland freight carrier then picks up the partial container load freight shipments and loads them, for example, onto a truck container or other appropriate shipping container.

The Routing & Booking Component 44 also optionally includes means for assigning a container shipment carrier and vessel/voyage for planned loads, such as one or more interactive menus similar to those previously described.

As referenced above, the container loads optionally have an international carrier and vessel/voyage assigned prior to utilization of the Container Load Planning and Building Component 42. For loads that were consolidated into container loads, the Routing & Booking Component 44 provides the system user with an option to request automatic assignment of an international carrier and vessel/voyage or to select an appropriate international carrier and vessel/voyage manually based upon information from the MQC Balancing Module 24, described in greater detail below.

In some embodiments, if the system user selects the manual option for assignment, the Routing & Booking Component 44 automatically suggests an container shipment carrier based upon contractually established minimum quantity commitments (MQC) for a plurality of carriers. The MQC information is optionally provided by the MQC Balancing Module 24, described in greater detail below. The Routing & Booking Component 44 additionally or alternatively includes other means for determining an appropriate carrier, for example by accessing availability and pricing information on the Internet or other source.

The Consolidator Information Management Component 46 includes means for updating the Load Planning Component 42 and/or Routing & Booking Component 44 with information that one or more shipments have been received at a consolidator. For example, receiving information is manually or electronically received from the consolidator and input into the Profile Generation and Maintenance Component 40 or other system component, for example.

In some embodiments, the Consolidator Information Management Component 46 includes means for tracking, recording, and communicating shipping events relating to when shipments are received, consolidated into loads and/or shipped to port from the consolidator. For example, the Consolidator Information Management Component 46 includes one or more algorithms for maintaining timestamp information for stops, pick ups, information relating to the sealing of a particular container, confirmation of receipt at a Consolidator Container Freight Station (CFS), delivery timestamps at port, and others.

In some embodiments, RFID technology, bar codes, GPS, and/or other technologies are used to track, record, and communicate shipping event information. The Consolidator Information Management Component 46 also includes process capability to maintain inland issue events such as the shipment not being picked up on time at a stop because the shipment is not ready or a shipment not being picked up on time due to inland freight carrier lateness.

The MQC Balancing Module 24 operates based upon contractual obligations with an international carrier for minimum quantity commitments (MQC) of containers to be shipped by the international carrier. As subsequently described, the MQC Balancing Module 24 includes means for MQC determination and rate management, assigning MQC by shipping lane (where a shipping lane includes a route from one specified point to another point), determining MQC loading by international carrier, and tracking MQC obligation fulfillment. The means for performing such tasks optionally include one or more interactive menus similar to those previously described.

Figure 9:
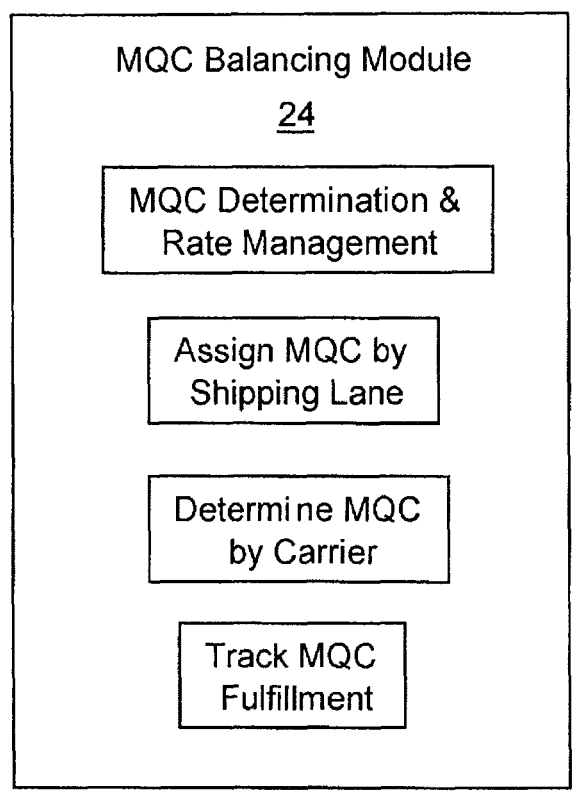
FIG. 9 is a schematic view of Minimum Quantity Commitment Balancing processes of the System of FIG. 1, according to some embodiments.

FIG. 9 illustrates MQC processing in schematic form. The process of MQC determination and rate management is provided by contracting an annual minimum quantity amount, for example. Container shipment obligations can then be determined by month, week, or day, for example, for each ocean carrier. The determined MQC is assigned by shipping lane, where shipping lanes extend between the port of origin to a destination gateway.

The running tally of containers fulfilling MQC obligations to carriers is updated and recorded. For example, the MQC Balancing Module 22 optionally includes one or more databases for storing MQC data and processors for receiving and updating the MQC data. The MQC Balancing Module 24 is optionally integrated and/or interactive with Modules 22, 26 sharing information and/or process tasks as desired.

Figure 10:
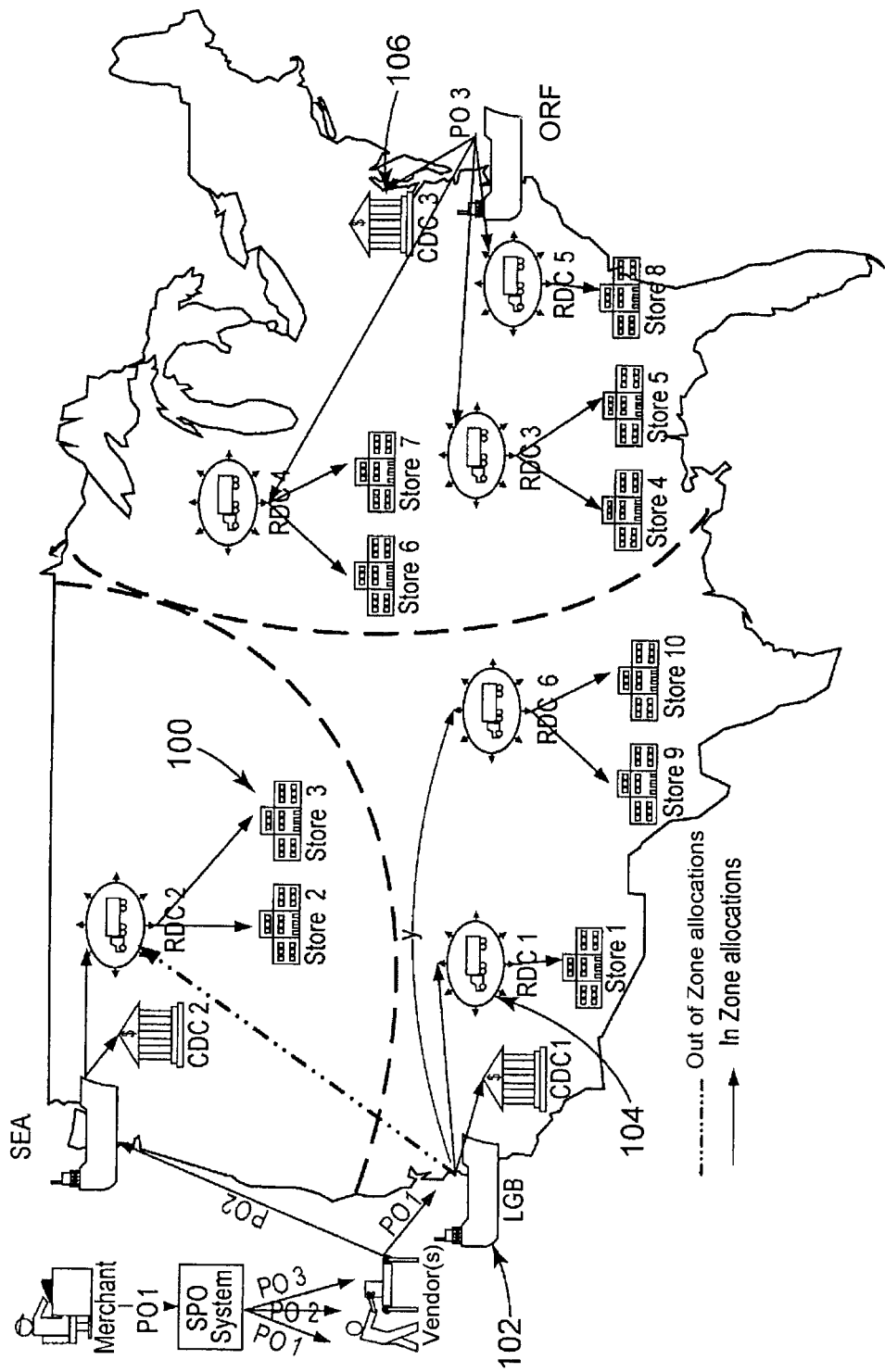
FIG. 10 is a schematic view showing importation gateways, according to some embodiments.

The Gateway Balancing Module 22 assists with balancing incoming container shipments between gateways according to the loading of gateway resources. FIG. 10 is a schematic showing various importation gateways. For reference, a "gateway" for incoming shipments of goods to be delivered to retail locations 100 is supported by ports of arrival 102 (including inland ports of arrival, such as airports or ocean carrier ports located inland, e.g., Chicago ocean carrier ports on Lake Michigan), de-consolidators 104, import warehouses, trucking, and distribution centers 106, for example. In general terms, the Gateway Balancing Module 22 provides means for balancing shipments of a plurality of containers on one or more container shipment carriers between a plurality of associated gateways. Once the container shipment carrier is assigned to ship the container load, the one or more container loads are loaded onto a ship of the container shipment carrier. The container shipments are then delivered to a recommended gateway with the ship and unloaded at the recommended gateway.

In some embodiments, gateways for U.S. importation include Pacific Coast gateways, such as Pacific Northwest, Pacific Southwest, a Pacific Central Coast, Prince Rupert, and Lazaro Cardenas Gateways, Atlantic Coast gateways, such as Atlantic Southeast, Atlantic Northeast, Atlantic Central Coast Gateways, and Gulf of Mexico gateways, such as a South Central Coast Gateway.

As previously referenced, container shipment carriers (e.g., ocean carriers or air carriers), are booked for shipping containers via one or both of the Inland Freight Management and MQC Balancing Modules 22, 24. The Gateway Balancing Module 22 optionally includes various levels of balancing prior to, during, and after the container shipment carrier booking process. Although various levels of balancing are described, it should be understood that a fewer number of levels, a greater number of levels, or any combination of balancing levels is contemplated according to various embodiments.

A first level of gateway balancing optionally includes assigning ports of origin (where containers are exported) with destination gateways (where containers are received) based on a variety of factors, such as anticipated purchase order volumes to be sourced out of a particular market of origin. For reference, a "purchase order" relates to products ordered from one or more vendors, those products being imported as one or more container shipments on one or more container shipment carriers.

A second level of balancing optionally includes utilizing a split purchase order process, or an "SPO process," where large purchase orders are automatically split into smaller purchase orders to be delivered between multiple gateways.

A third level of balancing is described in greater detail below. In some embodiments, the third level of balancing occurs prior to carrier booking, ending when carrier booking is confirmed with the international carrier.

A fourth level of balancing is optionally achieved after carrier booking, but prior to departure of a container shipment (e.g., via ocean carrier or air carrier). In some embodiments, the fourth level of balancing has a low utilization rate due to international carrier re-booking fees. For example, utilization of this fourth level balancing occurs in less than 5% of booked shipments in some embodiments.

A fifth level of balancing is optionally achieved through a vessel diversion process, where one or more carrier vessels are diverted en route to a gateway. This fifth level of balancing is typically less frequently utilized. The fifth level of balancing may cause relatively high fees to be levied by the carrier in order to allow this type of vessel diversion, which happens relatively late in the shipping process.

Figure 12:
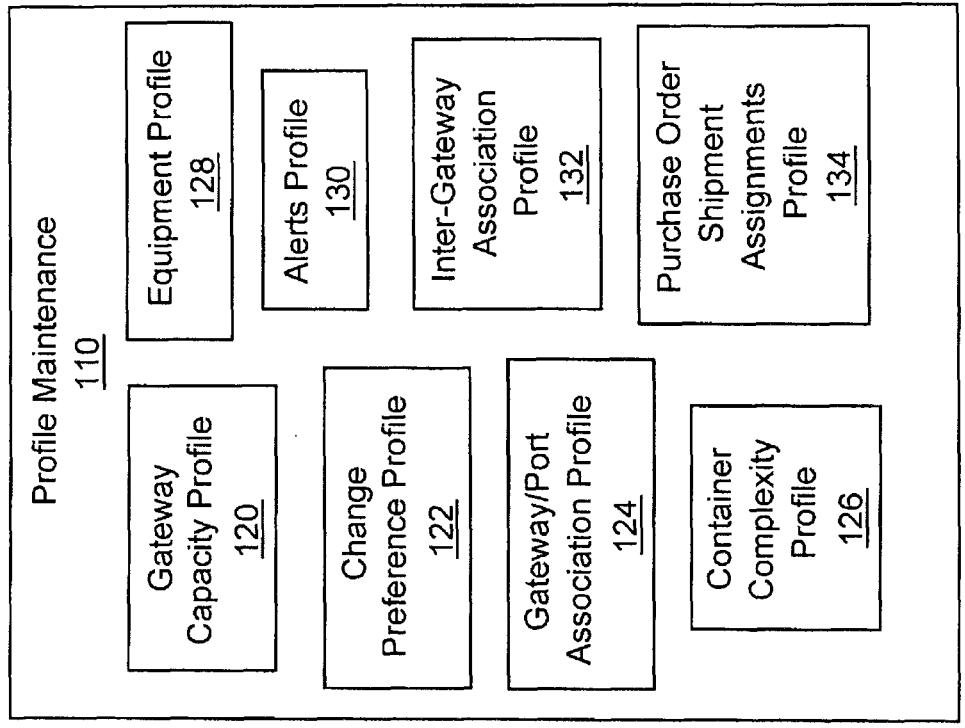
FIG. 12 shows a Profile Maintenance Component, according to some embodiments.
Figure 11:
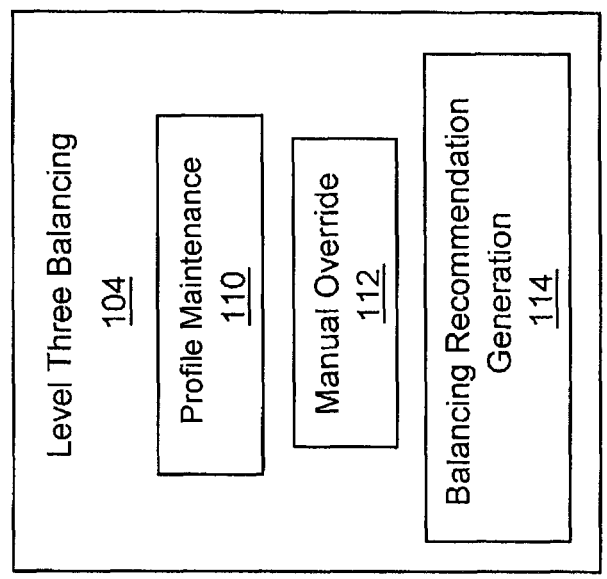
FIG. 11 is a schematic view of level three balancing of the Gateway Balancing Component, according to some embodiments.

As shown in FIG. 12, the third level of balancing includes a Profile Maintenance Component 110, a Manual Override Component 112, and a Balancing Recommendation Generation Component 114. FIG. 13 shows various features of the Profile Maintenance Component 110 in greater detail. As shown in FIG. 12, the Profile Maintenance Component 110 includes means for generating and maintaining a Gateway Capacity Profile 120, a Change Preference Profile 122, a Gateway/Port Association Profile 124, a Container Complexity Profile 126, an Equipment Profile 128, an Alerts Profile 130, an Inter-Gateway Association Profile 132, and a Purchase Order Shipment Assignments Profile 134.

In some embodiments, the Profiles Component 110 includes one or more electronic databases for storing profile information and is adapted to receive electronic information that is manually input by a system user or is otherwise received from another source, for example from one of the Modules 22, 24 and/or via a network communication. In particular, generation and maintenance of the various profiles are automated to a desired extent through the use of computer hardware, software, and related technologies.

In some embodiments, the process of generating and maintaining the Gateway Capacity Profile 120 includes gathering and maintaining de-consolidator container capacity information, import warehouse container capacity information, and trucking market capacity information. In some embodiments, the gateway capacity information is by specific day, although the capacities can be evaluated according to other time frames.

For reference, a de-consolidator divides and sorts container contents from container shipments into smaller quantities for distribution. In some embodiments, each de-consolidator generally has a facility that serves one or more customers, one of which is the large retail entity (LRE). In some embodiments, the large retail entity (LRE) forecasts a minimum de-consolidation volume for one or more de-consolidators.

The container de-consolidator capacity information includes a minimum quantity and minimum quantity threshold which is forecasted for the de-consolidator. The minimum quantity represents a target minimum amount to provide the de-consolidator and the minimum quantity threshold, expressed as a percentage, for example, represents a self-imposed maximum allowable downward deviation from the minimum quantity.

In some embodiments, the de-consolidator information also includes a maximum quantity and a maximum quantity threshold. The maximum quantity is a target maximum amount that the de-consolidator should be provided with and the maximum quantity threshold, expressed as a percentage, for example, represents a self-imposed maximum allowable upward deviation from the maximum quantity. The de-consolidation capacity information also optionally includes an ideal quantity which is based on the planned volume of containers being shipped to a particular gateway.

The de-consolidator and/or the large retail entity (LRE) establishes the maximum and minimum container capacity values by evaluating the LRE's anticipated de-consolidation volume requirements, de-consolidator overall volume capabilities, reductions in de-consolidator volume capability from other de-consolidator customers, and other factors affecting de-consolidator performance.

The import warehouse capacity information and/or trucking market capacity information are optionally similarly established, including minimum, maximum, and/or ideal quantity information, for example. Alternatively, market trends, historical data, and/or other information is analyzed to forecast import warehouse capacity and/or trucking market capacity.

The Change Preference Profile 122 includes information relating to a ranking of container shipments that are most eligible to least eligible for a gateway change. In some embodiments, the Change Preference Profile 122 also includes category information. The category information is generated by grouping and ranking container shipments for gateway change eligibility according to product type and/or whether the purchase order relating to the container shipment was generated during the first level of gateway balancing 100 as a split purchase order.

The Change Preference Profile 122 also optionally includes information relating to the minimum number of days prior to booking the vendor for container items that the Gateway Balancing Module 22 should consider corresponding container shipments eligible for balancing. In some embodiments, the minimum number of days is zero. In other words, in some embodiments, container shipments are not eligible for balancing until at a vendor supply location has been booked to provide the container contents and/or entire purchase order volume.

The Change Preference Profile 122 also optionally includes information relating to the booking status of container shipments and timing when the Gateway Balancing Module 26 should no longer consider a container shipment as eligible for gateway balancing between the plurality of associated gateways. In some embodiments, the container shipment is no longer eligible for gateway balancing when the container shipment carrier (e.g., ocean or air carrier) sends a reservation confirmation for shipping the containers.

The Gateway/Port Association Profile 124 optionally includes information relating import gateways and the ports of arrival associated with the import gateways. In some embodiments, the profile also includes information relating export gateways and the ports of export associated with the export gateways. This profile also optionally includes information relating to association of one or more de-consolidators with an import gateway, as well as association of one or more consolidators with an export gateway or export port.

The Container Complexity Profile 126 includes information relating to the relative complexity of a container in terms of de-consolidation, or a container de-consolidation complexity factor. For reference, one or more factors relating to de-consolidation complexity are optionally combined to evaluate consolidation complexity. In particular, a variety of factors play a role in how much time/effort container de-consolidation (as well as consolidation) requires. For example, in some embodiments, a container consolidation factor is employed during inland freight management, for example during load planning & routing, to efficiently accomplish field consolidation in an analogous manner to container de-consolidation.

In some embodiments, a variety of factors are averaged or otherwise combined to rank all containers for a plurality of shipments associated with one or more gateways on a relative complexity scale. As will be described in greater detail below, the Balancing Recommendation Generation Component 114 accesses appropriate data, for example profile information, and calculates the container complexity factors. In some embodiments, a container with moderate de-consolidation complexity is optionally used as a starting point, or baseline complexity, with a base rating of 1.00. A more complex container has a higher rating, for example where a rating of 3.00 is equal to de-consolidating the contents of three containers even though it is one physical piece of equipment. A less complex container has a lower rating, for example of 0.05, the equivalent of one-twentieth of the average container.

One container de-consolidation complexity factor relates to carton complexity. A carton complexity factor is optionally evaluated by the ratio of the number of shipping cartons relative to the cubic volume of the container in which they are shipped. Fewer cartons are typically less complex to de-consolidate. In particular, fewer cartons require fewer physical moves during de-consolidation, reducing the relative complexity of de-consolidation.

As one non-limiting example, in some embodiments, three ranges of ratios are selected to correspond to a low complexity ranking of 1, a medium complexity ranking of 2, and a high complexity ranking of 3. In other words, the higher the ratio, the more complex the cartons are to de-consolidate, and the higher the carton complexity ranking. Although three ranges with three corresponding rankings have been described, the evaluation and designation of greater or fewer levels of complexity are also contemplated.

Another container complexity factor relates to item complexity. An item complexity factor is optionally evaluated by the number of items on a purchase order associated with a container where a greater variety in container contents requires greater time in sorting and receiving. For example, a de-consolidator often has to sort by container contents during de-consolidation in order to receive and account for purchase order items, as well as scan by item when creating outbound ship notice manifests for delivery to the retail locations (FIG. 1), for example. Again, and in general terms, the more items there are the more complex and time consuming, while the less items there are, the less number of physical moves.

In some embodiments, the item complexity factor is evaluated by selecting a plurality of ranges for the number of purchase order items and assigning complexity rankings to each range. As one non-limiting example, four ranges, or groups, are selected as follows: 1-5 different purchase order items per container corresponds to an item complexity ranking of 1, 6-10 different items corresponds to an item complexity ranking of 2, 11-20 different items corresponds to an item complexity ranking of 3, and 21 or more different items corresponds to an item complexity ranking of 4. It should be understood that a variety of other ranges and associated rankings are contemplated, such as 100 or more items corresponding to an item complexity ranking of 4, or others.

A distribution center complexity factor relates to the number of distribution centers to which the container contents are allocated. If a container load is associated with a relatively large number of distribution centers, the de-consolidator will be required to perform a greater number of tasks during de-consolidation to ensure delivery to the distribution centers. In some embodiments, distribution center complexity is evaluated by selecting a plurality of ranges of nos. of associated distribution centers for a purchase order and assigning complexity rankings to each range.

As one non-limiting example, four ranges, or groups, are optionally selected as follows: 1-5 distribution centers corresponds to a distribution center complexity ranking of 1, 6-10 distribution centers corresponds to a distribution center complexity ranking of 2, 11-20 distribution centers corresponds to a distribution center complexity ranking of 3, 21 or more distribution centers corresponds to a distribution center complexity ranking of 4, and no distributions centers, or no allocation, corresponds to a neutral distribution center complexity ranking of 1. It should be understood that a variety of other ranges and associated rankings are contemplated, such as 100 or more items corresponding to a distribution center complexity ranking of 4, or others.

Another container complexity factor relates to the type of required item handling. For example, an item handling complexity factor optionally relates to whether container contents are conveyable, non-conveyable, require more than one person to carry, and others modes of handling. As one non-limiting example, in some embodiments, there are three item handling complexity factor groupings: a conveyable item grouping having an item handling complexity factor of 1, a non-conveyable grouping having an item handling complexity factor of 2, and a team lift grouping having an item handling complexity factor of 3.

At times, a purchase order will include conveyable items that are to be de-consolidated at a de-consolidator with automated sorting equipment. In some embodiments, all container complexity for the purchase order is cancelled out, with all containers being given a neutral rating of 1.

In some embodiments, all of the container complexity factors are averaged to obtain the overall complexity value for the containers associated with a purchase order. If desired, one or more of the complexity factors previously described is weighted to have greater or lesser effect on the computation of overall container complexity. For example, it might be determined that the carton complexity factor is more important than the other factors, with a weighting multiplier being applied to the carton complexity factor.

Regardless, a relative scale of complexity for containers is established by establishing the range for all of the purchase order containers. The overall range is then divided into a plurality of sub ranges, or categories, five for example. Each of the sub ranges corresponds to a different "faux" container handicapping level. For reference, and as alluded to above, the capacities of de-consolidators are assumed to be for an average container complexity.

For example, a handicapping level of 1.00 is indicative of an average container complexity. As one non-limiting example, in some embodiments, the faux container handicapping levels include the following: "super complex" containers having a value of 4 (where one super complex container is equated to de-consolidating 4 average containers), "very complex" having a value of 3 (where one very complex container is equated to de-consolidating 4 average containers), "complex" having a value of 2 (where one complex container is equated to de-consolidating 2 average containers), "moderate" having a value of 1 (where one moderate container is the average container), and "non-complex" having a value of 0.5 (where a non-complex container is equated to de-consolidating half of the average container). The faux container handicapping levels are used to adjust or otherwise forecast a more realistic evaluation of the deconsolidation capacity of one or more gateways during gateway balancing as described in greater detail below.

The process of generating the information included in the Container Complexity Profile 126 is achieved automatically in some embodiments, via one or more algorithms adapted to process profile information maintained by the Profile Maintenance Component 110 and/or the other Modules 22, 24. For example, the information is optionally established by the Profile Maintenance Component 110, the Generate Balancing Recommendations Component 114, or other portions of the System 20.

The Equipment Profile 128 includes available shipping container information by port and carrier. In some embodiments, the Equipment Profile 128 is substantially the same as the Equipment Profile 70 of the Inland Freight Management Module 22, including similar information and/or being stored in the same location, such as a central database, for example.

The Alerts Profile 130 includes information about alerts accessed by various components of the Gateway Balancing Module 26. For example, the alert for balancing to an exception gateway is maintained in the Alerts Profile 130, which is then accessed and displayed to a system user by the Manual Override Component 112 or Generate Balancing Recommendations Component 114, for example.

The Inter-Gateway Association Profile 132 includes association information relating various import gateways. In particular, various gateways are associated with one another in terms of their eligibility for balancing container shipments between the gateways. In some embodiments, the association information includes a relative ranking designating a preferential order of balancing associations. For example, a first gateway optionally has primary, secondary, tertiary, quaternary, exception 1 through exception 5, and non-associated designations for a plurality of gateways, where the primary designation indicates the most favored location for gateway balancing from the first gateway and the non-associated designation indicates a non-eligible gateway for balancing from the first gateway.

Figure 14:
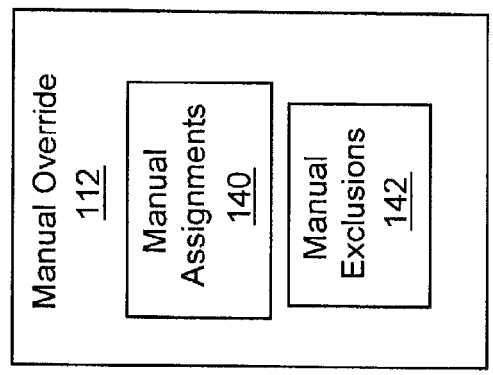
FIG. 14 is a schematic view of a Manual Override Subcomponent of the Gateway Balancing Component, according to some embodiments.

One non-limiting example of a data screen 138 showing inter-gateway associations is provided in FIG. 14. As referenced above, a "primary" associated gateway is the first most likely candidate for gateway balancing. In some embodiments, the primary gateway is the next closest gateway and/or the gateway having most comparable receiving and de-consolidation resources to the gateway from which a shipment is to be balanced. A non-associated gateway is generally not a candidate for gateway balancing. An "exception" gateway is a candidate for balancing in special circumstances. For example, in some embodiments, balancing to an exception gateway triggers a user alert maintained in the Alerts Profile 130, for example.

The Purchase Order Shipment Assignments Profile 134 includes information relating to which gateways container shipments have been initially assigned during vendor booking and/or container shipment carrier booking processes. For reference, the container shipments are initially associated with a gateway during one or more vendor booking processes used by the Large Retail Entity (LRE) and/or container shipment carrier booking processes used by the LRE, such as those employed with the MQC Balancing Module 22.

In some embodiments, container shipment carrier booking for one or more container shipments results in an entire purchase order being booked for a single gateway. In other embodiments, where a purchase order is partly shipped CY (full container load from vendor to port) and partly shipped CFS (field and/or centrally consolidated loads) there is the potential that the (CFS) part of the purchase order container shipment is booked for a different gateway than the Container yard (CY) part of the purchase order container shipment.

Figure 15:
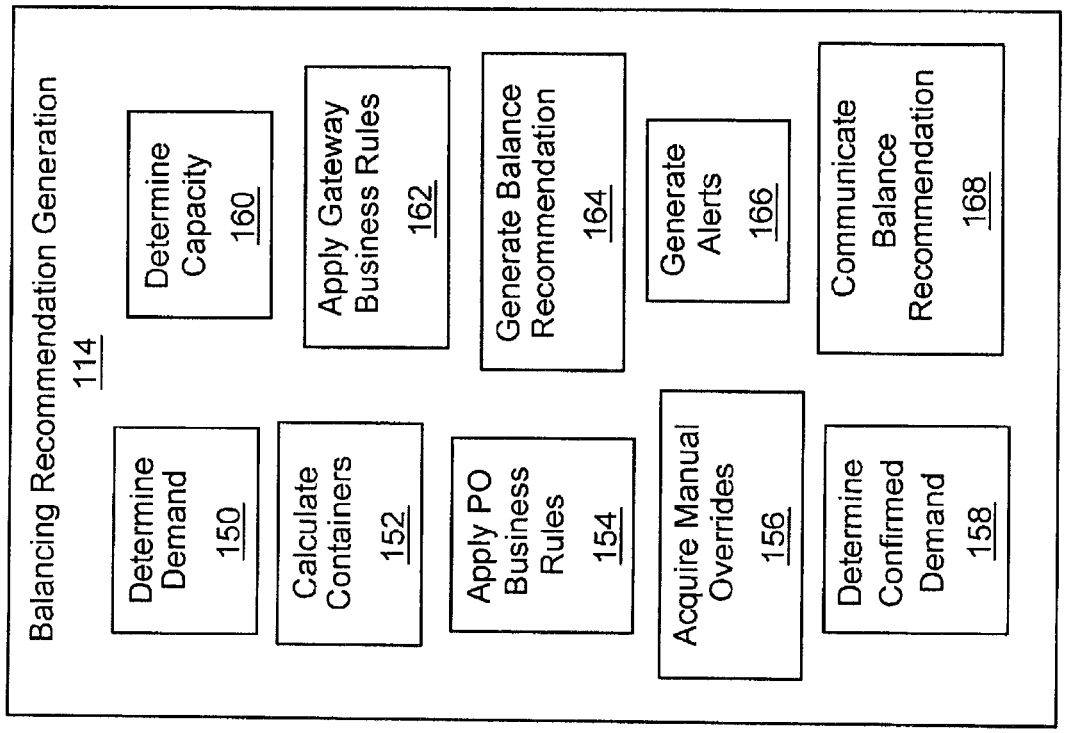
FIG. 15 shows a Balancing Recommendation Generation Subcomponent of the Gateway Balancing Component, according to some embodiments.

FIG. 15 shows various features of the Manual Override Component 112. In some embodiments, the Manual Override Component 112 includes means for generating Manual Assignments 140 and Manual Exclusions 142. The Manual Override Component 112 optionally includes one or more interactive menus displayed to the system user, for example on a user interface, such as those previously described.

The Manual Assignments 140 are generated by manually assigning a gateway to a container shipment, for example by using a menu selection. The Manual Assignments 140 lock gateways and purchase orders together as desired. In some embodiments, locking the manual assignment causes the Manual Override Component 112 to designate the manually assigned container shipment as non-eligible for balancing. However, as described in greater detail below, the container volume of the manually assigned container shipment is still considered by the Balancing Recommendation Generation Component 114. The Manual Override Component 112 is also adapted to allow unlocking, gateway changes, and re-locking of the container shipment as desired.

The Manual Exclusions 142 are generated by manually excluding one or more container shipments from being considered by the Balancing Recommendation Generation Component 114. In particular, the Manual Override Component 112 is adapted to remove Manual Exclusion container shipment container volumes from consideration during the balancing process. In some embodiments, the Manual Override Component 112 is adapted to automatically designate various container shipments as Manual Exclusions 142. For example, "Inland Point Intermodal" orders ("IPI orders") are optionally automatically excluded from the Balancing Recommendation Generation Component 114.

As alluded to above, the Balancing Recommendation Generation Component 114 includes means for generating gateway balancing recommendations for one or more container shipments being imported for de-consolidation and distribution. As shown in FIG. 16, the Balancing Recommendation Generation Component 114 includes a Determine Demand Subcomponent 150, a Calculate Containers Subcomponent 152, an Apply PO Business Rules Subcomponent 154, an Acquire Manual Overrides Subcomponent 156, a Determine Confirmed Demand Subcomponent 158, a Determine Capacity Subcomponent 160, an Apply Gateway Business Rules Subcomponent 162, a Generate Balance Recommendations Subcomponent 164, a Generate Alerts Subcomponent 166, and a Communicate Balance Recommendations Subcomponent 168.

The Determine Demand Subcomponent 150 includes means for determining gateway demand by identifying container shipment container volumes that have been initially booked to ship to a particular gateway within a certain time frame. In some embodiments, the means for identifying container shipment volumes includes one or more interactive menus that access the list of container shipments from the Initial Purchase Order Shipment Assignments Profile 134 and then filters the list according to a range of dates, such as a range of estimated dates of arrival at port or de-consolidator, for example. The initial demand on a particular gateway is initially forecast in this manner for a particular date, a range of dates, or other time period as desired.

The Calculate Containers Subcomponent 152 includes means for handicapping, or adjusting, the forecasted volume containers that are to be shipped to a plurality of gateways. In particular, a handicapped demand, also described as an adjusted or weighted demand, for the gateways initially assigned to the container shipments is determined from the initial demand obtained using the Determine Demand Subcomponent 150. For example, two actual containers from one or more purchase orders to be shipped can be handicapped, or weighted, such that they are the equivalent of processing six standard containers of average complexity using complexity handicapping information from the Container Complexity Profile 126. In some embodiments, the Calculate Containers Subcomponent 152 includes software, one or more algorithms, networking capabilities, or other means for accessing necessary purchase order information, calculating the handicapping information, storing the handicapping information in the Container Complexity Profile 126, and accessing the handicapping information as desired.

The Apply Purchase Order Business Rules Subcomponent 154 includes means for accessing and applying information from the Change Preference Profile 122 to the container shipments in order to rank the container shipments according to which are most eligible to least eligible for gateway changes. In some embodiments, Subcomponent 154 includes one or more interactive menus and appropriate algorithms for selecting or otherwise enabling application of the Change Preference Profile 122.

The Acquire Manual Overrides Subcomponent 156 includes means for accessing the Manual Assignments 140 and Manual Exclusions 142 generated using the Manual Override Component 112. In particular, the Acquire Manual Overrides Subcomponent 156 is adapted to help ensure that the Manual Assignments 140 are excluded from balancing, although the container shipment container volumes are included for determining gateway demand. In turn, the Manual Exclusions 142 container volumes are removed entirely from consideration in balancing gateways.

The Determine Confirmed Demand Subcomponent 158 includes means for considering the confirmed demand and unconfirmed demand on the gateways represented by container shipment containers. The Determine Confirmed Demand Subcomponent 158 is adapted to filter the confirmed demand (demand represented by carriers who have already sent reservation confirmation for shipping) and/or unconfirmed demand (not yet confirmed for shipping by the carrier) for balancing eligibility according to the estimated time of arrival (ETA) at a gateway.

As previously referenced, the confirmed demand on a gateway is generally less eligible for balancing. In some embodiments, the estimated time of arrival at a particular gateway is determined relative to an estimated time of arrival at a de-consolidator of the gateway, which is some number of days (e.g., 2 days more) from the estimated time of arrival of a vessel at the gateway port of arrival. In some embodiments, the Determine Confirmed Demand Subcomponent 158 includes one or more interactive menus and associated algorithms, such as those previously described, utilized by the system user to calculate and evaluate confirmed and/or unconfirmed demand on gateway resources, including de-consolidation resources, for example.

In some embodiments, the Determine Confirmed Demand Subcomponent 158 prohibits container shipments within a pre-selected estimated time of arrival at a gateway consolidator from being eligible for balancing. In turn, in some embodiments Subcomponent 158 provides for any unconfirmed demand on the gateway to be eligible for balancing, regardless of estimated time of arrival at a consolidator, port of arrival, or other gateway component.

The Determine Capacity Subcomponent 160 includes means for determining de-consolidator capacity for a specified period of time corresponding to the estimated time of arrival of the container shipments being balanced. In some embodiments, Subcomponent 160 includes appropriate algorithms for calculating de-consolidator capacity and one or more interactive menus navigated by the system user to make such determinations. The period of time is optionally specified as a single day or a range of days as desired.

The Apply Gateway Business Rules Subcomponent 162 includes means for applying the Inter-Gateway Association Profile 132 to determine which gateways are eligible as alternatives to an initially designated gateway for container shipments. For example, Subcomponent 162 optionally includes an interactive menu selection that provides a list of potential alternate gateways for balancing.

The Generate Balance Recommendations Subcomponent 164 includes means for calculating a recommended gateway for container shipments based on gateway capacity (for example, de-consolidator capacity), demand (for example, de-consolidation demand), business rules, container complexity of the containers of the shipments and gateway container volumes being balanced, and others according to a gateway balancing process. As part of the gateway balancing process, the Subcomponent 164 provides a recommendation either to change gateways from an initially assigned gateway to an associated gateway or to proceed with shipment of the containers to the initially assigned gateway. Subcomponent 164 includes appropriate algorithms and communications for accessing the various Profiles and optionally includes one or more interactive menus to be viewed and navigated by the system user during the gateway balancing process.

The gateway balancing process is optionally scheduled to be automatically performed at a predetermined time, for example daily. The gateway balancing process can also be initiated upon user demand, for example via the interactive menus. Subcomponent 164 sends the recommendation information to a repository, such as a networked database, for users to view summarized or detailed information as desired. In some embodiments, if the de-consolidation demand on a particular gateway exceeds the allocated de-consolidation capacity, the inbound demand, or order volume must be shifted to another de-consolidator and/or a request for additional de-consolidation capacity must be made.

The Generate Alerts Subcomponent 166 includes means for alerting de-consolidators that the balancing process has not achieved appropriate de-consolidation balancing and that additional de-consolidation capacity is needed. For example, in some embodiments, Subcomponent 166 accesses the Alerts Profile 130 and generates an appropriate alert, such as an e-mail to one or more de-consolidators requesting capacity. The Generate Alerts Subcomponent 166 also optionally includes a visual alert on an interactive menu, an e-mail, and/or an audible alarm, for example, alerting the system user or other appropriate entities that balancing has not been achieved in accordance with one or more business rules or other criteria. As one example, an alert is optionally provided that a container shipment has been balanced to an exception gateway, requiring system user input whether to proceed with the exception gateway assignment.

The Communicate Balance Recommendations Subcomponent 168 includes means for communicating to other system components that a new gateway has been assigned one or more container shipments. System users or other appropriate entities, other system components, such as the Inland Freight Management Module 22, MQC Balancing Module 24, are provided with the information. In some embodiments, summary reporting is automatically generated and provided in an electronic format on one or more interactive menus.

In view of the foregoing, various embodiments of the System 20 provide means for managing an inland freight routing process, means for centralized booking of direct-import freight, and means for shipping rate management. Embodiments of the System 20 optionally provide automated forecasting processes to provide timely and accurate shipping information, a systematized method of assigning container shipments to international carriers based MQC obligations, and a systematized method to proactively calculate gateway demand and manage gateway usage, including de-consolidator workload management.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The following is claimed:

1. An inland freight management module on a computer processor for managing inland moves of freight from a plurality of vendor supply locations to port, the inland freight management module comprising:
   a profile maintenance component adapted for maintaining in a computer database an inland planning zone profile including information relating to a plurality of inland planning zones generated according to one or more customs districts;
   a load planning component including a programmed computer in communication with the profile maintenance component via a computer network and adapted for building partial load freight shipments from the plurality of vendor supply locations into container loads, the load planning component being programmed for planning field consolidation of one or more container loads via a multi-stop route between the plurality of vendor supply locations, the multi-stop route being generated within one of the plurality of inland planning zones; and
   a load routing and booking component including the programmed computer and one or more interactive menus for booking inland freight carriers for the multi-stop route,
   wherein the load planning component includes:
      a field consolidation subcomponent for identifying and selecting a first plurality of partial load freight shipments for field consolidation and multi-stop routing the first plurality of partial load freight shipments; and
      a central consolidation subcomponent for identifying and selecting a second plurality of partial load freight shipments and routing the second plurality of partial load freight shipments to a central consolidator.

2. The module of claim 1, wherein the profile maintenance component is further adapted for maintaining a booking queue profile including a list of partial load freight shipments in need of inland freight carrier booking, and further wherein the load planning component includes:
   a full container load handling subcomponent programmed to identify free carrier (FCA) CY load freight shipments from the booking queue profile, the full container load handling subcomponent programmed to cause the free carrier (FCA) CY load freight shipments to bypass multi-stop routing.

3. The module of claim 1, wherein the load planning component includes a fulfill field consolidation obligations subcomponent programmed to calculate and display field consolidation efficiency information.

4. The module of claim 1, wherein the profile maintenance component is further adapted for maintaining inland rating zone profile information relating to flat rate freight shipping costs based on vendor supply location proximity to port.

5. The module of claim 1, wherein the profile maintenance component is further adapted for maintaining an equipment profile including information relating to equipment availability information.

6. The module of claim 1, wherein the load planning component includes at least one interactive menu adapted to present freight shipment information to a system user and filter the freight shipment information according to one or more freight shipment selection criteria.

* * * * *